_US010335797B2_

(12) United States Patent
Yalin et al.

(10) Patent No.: US 10,335,797 B2
(45) Date of Patent: Jul. 2, 2019

(54) HEAVY DUTY DRIVE ARRANGEMENT AND MILL

(71) Applicant: FLSmidth A/S, Valby (DK)

(72) Inventors: Huseyin Yalin, Zurich (CH); Stefan Rittler, Freienstein (CH)

(73) Assignee: FLSmidth A/S (DK)

( * ) Notice: Subject to any disclaimer, the term of this patent is extended or adjusted under 35 U.S.C. 154(b) by 841 days.

(21) Appl. No.: 14/895,303

(22) PCT Filed: Jul. 8, 2014

(86) PCT No.: PCT/DK2014/050207
§ 371 (c)(1),
(2) Date: Dec. 2, 2015

(87) PCT Pub. No.: WO2015/003716
PCT Pub. Date: Jan. 15, 2015

(65) Prior Publication Data
US 2016/0121336 A1 May 5, 2016

(30) Foreign Application Priority Data

Jul. 8, 2013 (DK) .................................. 2013 70382

(51) Int. Cl.
*B02C 15/00* (2006.01)
*F16H 1/22* (2006.01)
(Continued)

(52) U.S. Cl.
CPC ............ *B02C 15/006* (2013.01); *B02C 15/00* (2013.01); *F16H 1/20* (2013.01); *F16H 1/22* (2013.01);
(Continued)

(58) Field of Classification Search
CPC ...... B02C 15/006; B02C 15/00; B02C 15/008; F16H 57/12; F16H 57/20
(Continued)

(56) References Cited

U.S. PATENT DOCUMENTS 2,687,045 A 8/1954 Schroeder
8,262,006 B2 * 9/2012 Berger ................. B02C 15/006
241/119
(Continued)

FOREIGN PATENT DOCUMENTS

DE 2111550 A1 9/1971
DE 3416506 A1 12/1984
(Continued)

OTHER PUBLICATIONS

International Search Report and Written Opinion dated Dec. 23, 2014, 8 pages.
Danish Search Report dated Feb. 19, 2014, 4 pages.

*Primary Examiner* — Faye Francis
(74) *Attorney, Agent, or Firm* — Jeffrey A. Sharp

(57) ABSTRACT

A heavy duty drive arrangement (1, 1') having a first spur gear including a first gear wheel (4; 4', 4") meshing with a pinion (3) of a motor (2) and a second spur gear comprising a gear wheel (8; 8', 8"). A drive pinion (9; 9', 9") configured to mesh with a ring gear (10) of the working equipment is coupled to the gear wheel (8; 8', 8") of the second spur gear and has an axis of rotation (E) which is essentially parallel to the rotor axis (A). The first spur gear and the second spur gear are coupled by means of a dynamic coupling (5; 5', 5"), preferably an elastic or a hydrodynamic coupling. A mill (20) may include the heavy duty drive arrangement (1, 1').

8 Claims, 6 Drawing Sheets

(51) Int. Cl.
*F16H 1/20* (2006.01)
*F16H 57/12* (2006.01)

(52) U.S. Cl.
CPC ........ F16H 57/12 (2013.01); *B02C 2015/008* (2013.01)

(58) Field of Classification Search
USPC .................................................. 241/117–113
See application file for complete search history.

(56) References Cited

U.S. PATENT DOCUMENTS

| | | | | |
|---|---|---|---|---|
| 9,789,488 B2* | 10/2017 | Klotzek | ................ | B02C 15/007 |
| 2010/0193616 A1* | 8/2010 | Berger | .................. | B02C 15/006 |
| | | | | 241/30 |

FOREIGN PATENT DOCUMENTS

| | | |
|---|---|---|
| DE | 3534940 A1 | 5/1986 |
| DE | 3931116 A1 | 3/1991 |
| DE | 102006050205 A1 | 5/2008 |
| EP | 2492016 A1 | 8/2012 |
| GB | 09138 A | 3/1916 |
| SU | 1227238 A1 | 4/1986 |
| WO | 2012127736 A1 | 9/2012 |

\* cited by examiner

HEAVY DUTY DRIVE ARRANGEMENT AND MILL

TECHNICAL FIELD

The invention relates to a heavy duty drive arrangement for working equipment, preferably a roller mill, as well as to a mill comprising at least one heavy duty drive arrangement.

BACKGROUND ART

DE 39 31 116 A1 (Krupp Polysius AG) discloses a drive arrangement for a roller mill comprising a ring gear and an axial bearing, wherein the axial bearing is located directly beneath the ring gear. The ring gear meshes with two pinions of an ancillary transmission. The ancillary transmission further comprises a spur gear coupled to said two pinions and a bevel gear, wherein the bevel gear is coupled with a pinion of a motor. While such a configuration of the mill allows a reduction of the total height of the mill, the drive still relies on a horizontally mounted motor and hence needs a bevel gear to transmit torque from the motor into the ancillary transmission.

DE 102006050205B4 (Gebr. Pfeiffer AG) describes a redundant drive arrangement for a roller mill comprising a plurality of independent drive units mounted on carriages. Each drive unit comprises a motor as well as a spur gear. The number of drives installed in a mill is selected such that the mill may be used even if one of the drive units fails and has to be repaired or replaced. The motor may either be arranged horizontally, which requires an additional bevel gear to transmit torque to the spur gear or arranged vertically within a cavity provided in the fundament of the mill.

CH 672 603 (Maag Zahnräder & Maschinen AG) discloses a bowl mill drive comprising a motor with a vertical drive shaft which acts on a spur gear by means of a pinion. The motor is arranged above the spur gear. The spur gear comprises a plurality of wheels and finally transmits the torque to a grinding bowl via a shaft and a planetary gear arranged beneath the grinding bowl.

As only small tolerances for bevel gears are acceptable at such high loads, high precision is needed when producing and mounting the bevel gear which results in high overall costs of the drive arrangement. Further, angular vibrations as well as recoils during operation of the mill may damage the gear arrangement or the motor or at least increase the wear of these parts.

SUMMARY OF THE INVENTION

It is the object of the invention to create a heavy duty drive pertaining to the technical field initially mentioned, which allows a reduction of the overall size of the gear arrangement while keeping the construction simple and hence the costs low. Further, it is also an object of the invention to provide a heavy duty drive arrangement which allows an efficient dampening of any angular vibrations and/or recoils from a working equipment driven by the heavy duty drive to the motor. A further object is also to provide a heavy duty drive arrangement which may be used in a modular way, allowing a great flexibility in the number of drives used for working equipment and hence also allowing a flexible power output variation.

The solution of the invention is specified by the features of claim 1. According to the invention the heavy duty drive arrangement comprises a motor having a rotor axis and driving a pinion. Further, the drive arrangement comprises a first spur gear comprising a gear wheel meshing with said pinion and a second spur gear comprising a gear wheel coupled to the first spur gear. At least one drive pinion is included in the drive arrangement, said at least one drive pinion being coupled with the gear wheel of the second spur gear and being adapted to mesh with a ring gear of the working equipment. The axes of the first gear wheel of the first spur gear, of the gear wheel of the second spur gear as well as the axis of the drive pinion are essentially parallel to the rotor axis of the motor. The first spur gear and the second spur gear are coupled by means of a dynamic coupling. The dynamic coupling preferably is an elastic coupling or a hydrodynamic coupling. The heavy duty drive arrangement according to the present invention is intended for driving a working equipment, preferably a vertical roller mill.

As understood herein, a "heavy duty drive" is a drive intended to drive high loads, e.g. with weights of several tons for a considerable amount of time, such as days, without any interruption.

Further, as understood herein, a "spur gear" is a gear comprising at least one spur gear wheel. However, a spur gear according to the present invention may also comprise more than one gear wheel, such as two, three, four or more gear wheels, wherein each of said multitude of gear wheels are arranged one to another in a meshing manner.

The inventive heavy duty drive arrangement is used to drive working equipment, such as rock grinders, cement mills, slag mills, and the like. Preferably, the drive arrangement is used to drive roller mills, more preferably vertical roller mills as used in the mining and cement industry.

The drive pinion of the drive arrangement is adapted in such a way that it may mesh with a ring gear of the working equipment. A person having skill in the art understands that depending on the type and size of the working equipment to be driven by the inventive driving arrangement, the dimensions of the pinion as well as the geometry of the teeth may vary. Further, it is to be noted that in most applications the drive pinion will mesh with a ring gear, but that in connection with some applications, the drive pinion may alternatively mesh e.g. with a gear wheel or any other type of transmission arrangement.

The term "dynamic coupling" as understood herein is a coupling which transmits torque from the first spur gear to the second spur gear, while allowing for some slip and/or dampening between both gears. A "hydrodynamic coupling" as understood herein is a coupling which transmits torque via a viscous fluid to which motion is imparted by means of an impellor. The motion of the fluid is then transferred to an output turbine, effectively resulting in a transfer of torque between the impellor and the output turbine.

"Essentially parallel" as understood herein means that the axes are parallel to each other or that they diverge from each other by a few degrees, preferably by less than 5 degrees, more preferably by less than 1 degree.

While a spur gear may be used to increase the rotational speed provided by a power source such as a motor, it is understood that in connection with working equipment in need of a heavy duty drive, the rotation speed of the power source, i.e. the motor, has to be reduced in order to drive the working equipment, as such large structures, like e.g. a vertical axis roller mill, are usually not driven at high speeds. Hence, the first and/or the second spur gear of the heavy duty drive arrangement according to the present invention is a reduction gear. For example, the input rotational speed of the motor may e.g. be 1,500 rpm, while the rotational speed of the drive pinion may be 150 rpm.

The motor preferably is an electric motor having a sufficient energy output and torque to drive the working equipment. In the case of the heavy duty drive arrangement according to the present invention, the motor preferably has an output of at least several hundred kilowatts, or even more preferably thousand kilowatts, however more preferably of more than one megawatt, such as e.g. from one megawatt to twenty megawatts. Alternatively, the motor might also be e.g. a hydraulic motor. However, in relation to a heavy duty drives, electric motors are preferred.

The gear wheels of the first and second spur gears and the dynamic coupling are preferably arranged in a straight line between the motor pinion and the drive pinion. However, depending on the type of working equipment, location and/or available space it is also conceivable to arrange the spur gears and/or the dynamic coupling in another spatial relation to each other, e.g. by providing an angle between the first spur gear and the second spur gear. Further, while it is preferred that the elements of the drive arrangement are arranged on essentially the same level in relation to the ground or a support, it is also possible to arrange specific elements on another level and to rotatably connect these elements by means of a shaft or the like. Such a configuration on different levels and/or by provision of angles between some elements may be used to reduce the space occupied by the inventive heavy duty drive arrangement.

It is also understood that the present heavy duty drive arrangement is preferably enclosed by at least one housing. Provision of a housing reduces the risk of accidents with e.g. maintenance personal and protects the drive arrangement from external influences. Such a housing preferably comprises openings, such as hatches, to allow monitoring or access to some parts of the drive arrangement for service purposes.

Additionally, the heavy duty drive arrangement according to the present invention may further comprise an auxiliary drive permanently or releasably coupled to the shaft of the motor, such as to drive the working equipment during maintenance or repair work. Preferably, the auxiliary drive is arranged on top of the motor and is connected to the axis of the motor by adequate means. Alternatively, the auxiliary drive may also be arranged beneath the motor, e.g. coupled to the shaft of the motor below the motor pinion. Use of such auxiliary drives is known in the art. Alternatively, the dynamic coupling might also be arranged directly on the motor shaft, i.e. between the motor shaft and the pinion, hence before the sequence of spur gears. Alternatively one or two Variable Frequency Converter(s) (VFC) may be used to drive one or two motors to drive the working equipment in maintenance mode.

The arrangement of the axes of the gear wheels of the first and the second spur gear essentially parallel to the rotor axis of the motor eliminates the necessity to use a bevel gear to transmit torque from the motor to the drive pinion, thus facilitating the assembly of the drive arrangement and reducing the costs. Further, the provision of a dynamic coupling after a first spur gear reduces the strain imposed on the coupling, as the rotational speed of the coupling will be reduced compared to the relatively high rotational speed of the motor, which may easily be around several hundred rpm, such as e.g. 750 or 900 rpm, to 3,000 rpm. The dynamic coupling is capable of absorbing torsional vibration as well as recoils transmitted from the working equipment via the drive pinion and the spur gears during use. This reduces the wear of the gear wheels and the risk of damage to the motor. Further, it imparts some damping between the motor and the drive pinion.

Preferably, the motor is arranged above the first spur gear. In the present application, the terms "above" and "below" refer to the horizontal arrangement of components relative to the direction of gravity.

Arranging the motor above the first spur gear has the advantage that the height of the spur gear may be reduced, as no shaft is necessary to bridge the height of the motor as would be the case when the motor is arranged on the same level as the spur gear. Further, it is also not necessary to provide any cavity, e.g. in the fundament of the working equipment, to put the motor in as would be the case when the motor is arranged below the first spur gear.

A further advantage is also that any lubricant used on the first spur gear will be drawn downwards and hence away of the motor by gravity. Hence, the motor does not need to be provided with a special seal to keep unwanted lubricant outside.

Additionally, the bearing of the rotor axis and pinion may be lubricated by the same lubricant as the first spur gear. As the rotational speed of the rotor axis and pinion are relatively high and both are under a high strain, provision of a lubricant greatly reduces the wear of the bearing. As the same lubricant as the first spur gear may be used, no separate lubricant supply has to be provided for said bearing, which facilitates the construction of the drive arrangement.

In a preferred embodiment, the drive arrangement comprises two first spur gears, two flexible couplings, two second spur gears and two drive pinions. The gear wheel of each of said two first spur gears meshes with the pinion of the motor and with one of the two flexible couplings each. Further, each of said flexible couplings is coupled to the wheel of one of said two second spur gears, wherein said wheel of each second spur gears is coupled with one of the two drive pinions. In this configuration, each sequence of first spur gear, flexible coupling, second spur gear and pinion are positioned in a straight line one after the other, both sequences preferably being arranged essentially parallel to each other.

With such a configuration, a torque split between both sequences is realized, hence allowing a reduction of the strain of the components of each sequence. Both sequences are preferably arranged parallel to each other such as to realize a quasi equal distribution of the torque to both sequences alike. Alternatively, both sequences may also be arranged angled to each other, however, in such a case the arrangement would have to be chosen such as to realize an equal split of the torque, e.g. by arranging both sequences symmetrically to each other, such as not to put a higher strain on one sequence compared to the other sequence.

Use of two sequences comprising a dynamic coupling has the advantage that a quasi even distribution of the torque to both sequences will be achieved, even in cases where the two pinions are slightly misaligned. Compared thereto, a misalignment of two pinions coupled to two "stiff" sequences, i.e. sequences comprising no dynamic coupling, would result in a transmission of torque only through one sequence. The difference of torque transmitted by two sequences having misaligned pinions is proportional to the product of the difference of the rotation angle of the sequences and the torsional stiffness of the sequences. A significant decrease of the stiffness is achieved by positioning a dynamic coupling within said sequences. By reducing the stiffness it is hence possible to reduce or even eliminate the difference of torque transmitted by each of the two sequences. Hydrodynamic couplings have no static stiffness and hence the use of hydrodynamic couplings in the parallel sequences results in no deviation of the torque transmitted by each sequence.

It is understood that other arrangements allowing a torque split may be chosen. For example, the drive arrangement may comprise one first spur gear, one dynamic coupling and one second spur gear meshing with two drive pinions. Alternatively, the dynamic coupling may also be coupled to two second spur gears while meshing with a single first spur gear. In principle, it may further be possible to further split the torque, e.g. by providing four drive pinions. A person having skill in the art will recognize that the inventive principle may be used in a combination of any number of first spur gear, dynamic coupling, second spur gear and drive pinion, the only limitation being mechanical and constructive restraints.

In an alternative embodiment, the dynamic coupling might also be arranged directly on the shaft of the motor, i.e. before the torque split.

Preferably, the pinion of the motor is arranged centrally between the wheels of both first spur gears. This ensures an equal torque split while allowing a maximal spatial separation between both transmission sequences.

Further preferably, the two flexible couplings are configured such as to allow a variation of the timing of the two drive pinions relative to each other. Hence, additional to the dampening effect, the flexible couplings allow a slight twist of the second spur gears and the drive pinions relative to each other, such as to allow a perfect alignment of the teeth of the two drive pinions with the teeth of the ring gear of the working equipment. A misalignment of the teeth might lead to an unequal torque distribution between both drive pinions or to a situation where one drive pinion drives the other drive pinion via the gear ring, which might lead to a "short circuit" of the torque transmission with destructive effect on the drive arrangement.

Further, the ratio of the torque split may be kept equal on both gear sequences, as a variation in load due to slight timing differences of the two drive pinions may be compensated for.

In another preferred embodiment, the pinion of the motor is supported such that it is movable in at least one direction perpendicular to the rotor axis. This allows positioning the pinion of the motor between the gear wheels of the two first spur gears at a location where exactly half the torque is transmitted to each first spur gear. Hence, such a configuration of the motor pinion decreases the occurrence of unequal wear of the two sequences of spur gears according to the present invention. Appropriate means to allow movement of a pinion or gear axis in a plane are known to a person having skill in the art.

Preferably, said at least one drive pinion is supported in a swivelling manner relative to the axis of rotation. This ensures an always optimal alignment of the at least one pinion relative to the ring gear of the working equipment, such that the teeth of the at least one pinion are always parallel to the teeth of the ring gear, even in the case where the ring gear is angularly displaced during operation of the working equipment. This greatly reduces the wear of the at least one drive pinion and of the ring gear.

In an alternative embodiment, the at least one drive pinion may be configured such as to comprise a curved outer surface which allows an always perfect alignment of the at least one drive pinion with the ring gear.

The first spur gear and/or the second spur gear preferably comprise more than one gear wheel, preferably two, three or four gear wheels arranged one after the other in a meshing manner.

Providing a sequence of gear wheels allows varying the distance between the motor pinion and the drive pinion. Further, by providing more than one gear wheel allows for a variation of the gear ratio of the drive arrangement by selecting appropriate diameters and tooth numbers for the gear wheels.

In an alternative embodiment, only the first gear wheel of a sequence of gear wheels of the first spur gear and/or the second spur gear has a different diameter and/or number of teeth relative to the motor pinion or the flexible coupling and all the other gear wheels of the respective spur gear are identical, such that no change of speed or torque is taking place within the first and/or second spur gear.

Preferably, the heavy duty drive arrangement according to the present invention is adapted to be used in connection with one or more frequency converters. Use of frequency converters facilitates the control of the motor speed.

Another aspect of the present invention is to provide a mill with at least one drive arrangement according to the present invention. The mill comprises a milling table supported on at least one axial bearing and having a ring gear affixed to the milling table. The at least one pinion of the at least one drive arrangement meshes with the ring gear of the milling table.

Preferably, the mill comprises two heavy duty drive arrangements according to the present invention. These two drive arrangements are preferably arranged on opposite sides of the milling table. This ensures an optimal distribution of the load. Further, even if one heavy duty drive arrangement has to be switched off for repair or maintenance, the mill may still be driven by the remaining drive arrangement with half the power. Further, as the load may be spread to two motors, use of two drive arrangements allows reducing the power output of each motor to half the total power needed for driving the mill. E.g. a mill needing a power output of 12 megawatts may be driven by two motors having an output of 6 megawatts each, which reduces the size, weight and complexity of the motor. Alternatively, the mill may comprise more than two heavy duty drive arrangements according to the present invention, such as three, four, five, six or more drive arrangements. This allows a better redundancy in case of a motor breakdown or maintenance as well as a further reduction of the motor size and weight. However, increasing the number of drive arrangements will increase the cost of the mill as well as the complexity in correctly timing all drive arrangements. Hence, an optimal tradeoff in relation of the number of drive arrangements has to be found for each mill, such that advantages and disadvantages of an increasing number of drive arrangements are balanced.

The mill according to the present invention is preferably a vertical roller mill. However, it is understood that the inventive configuration may also be used on any other type of mill known in the art. Further, it has to be noted that other kinds of working equipment may be equipped with two or more heavy duty drive arrangements according to the present invention.

While other parts of the mill are not being described in more detail, a person having skill in the art will understand that a mill according to the present invention comprises further parts, such as e.g. milling rollers, vertical bearings, a casing, a control unit, etc.

Preferably, the mill according to the present invention comprises a central tank for lubricant of a lubrication arrangement of each of the at least one heavy duty drive arrangements. The central tank is preferably located beneath the milling table, wherein lubricant from said central tank is provided to a lubricant provisioning device comprising at least one pump each for provisioning the lubrication arrangements of said at least one heavy duty drives.

It is understood that not only the heavy duty drive arrangements may be provisioned with lubricant, but e.g. also the at least one axial bearing.

Provision of such a central tank greatly facilitates the provisioning of lubricant to the heavy duty drives, as surplus lubricant may flow back from the heavy duty drives into the central tank and may hence be drawn out, e.g. by a pump, from only one location to a lubricant provisioning device, e.g. in a closed circuit manner. Equipping the lubricant provisioning device with a dedicated pump for each of the heavy duty drive arrangements has the advantage that an independent operation of the lubricant provisioning device of each heavy duty drive arrangement is possible.

It is understood that in most applications of the heavy duty drives according to the present invention the lubricant will be oil. However, in specific applications, use of other lubricants might also be envisaged.

Preferably, the ring gear is composed of at least two parts, e.g. two halves which are assembled to a continuous ring. This facilitates the transport of the ring gear, which often will have a diameter of several meters, such as e.g. 6 meters in an assembled state. The ring gear is preferably mounted around the periphery of the milling table. Further preferably, the teeth of the ring gear have symmetrical flanks, such that the ring gear may be inverted after wear to use the opposite flanks of the teeth.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
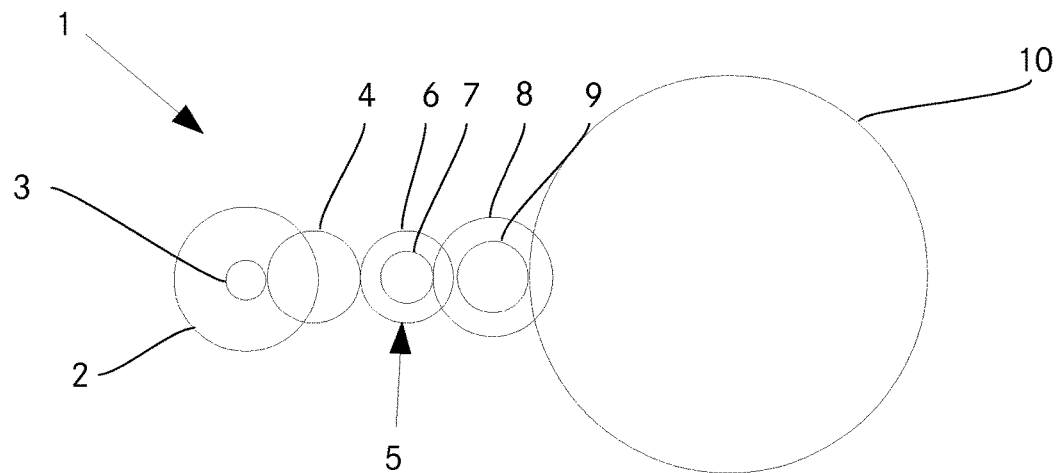
FIG. 1: A schematic top view of an embodiment of a heavy duty drive according to the present invention.

FIG. 1 shows a schematic representation of a first embodiment of an inventive heavy duty drive arrangement 1 according to the present invention. The heavy duty drive arrangement 1 comprises a motor 2 driving a pinion 3. The pinion 3 meshes with a first gear wheel 4 of a first spur gear. Said first gear wheel 4 meshes with an input side wheel 6 of a dynamic coupling 5. This input side wheel 6 is dynamically coupled, e.g. by means of an elastic element to an output side wheel 7. This output side wheel 7 meshes with a gear wheel 8 of a second spur gear. Said gear wheel 8 of the second spur gear is coupled via a shaft to a drive pinion 9 which is configured to mesh with a ring gear 10 of a working equipment.

Figure 2:
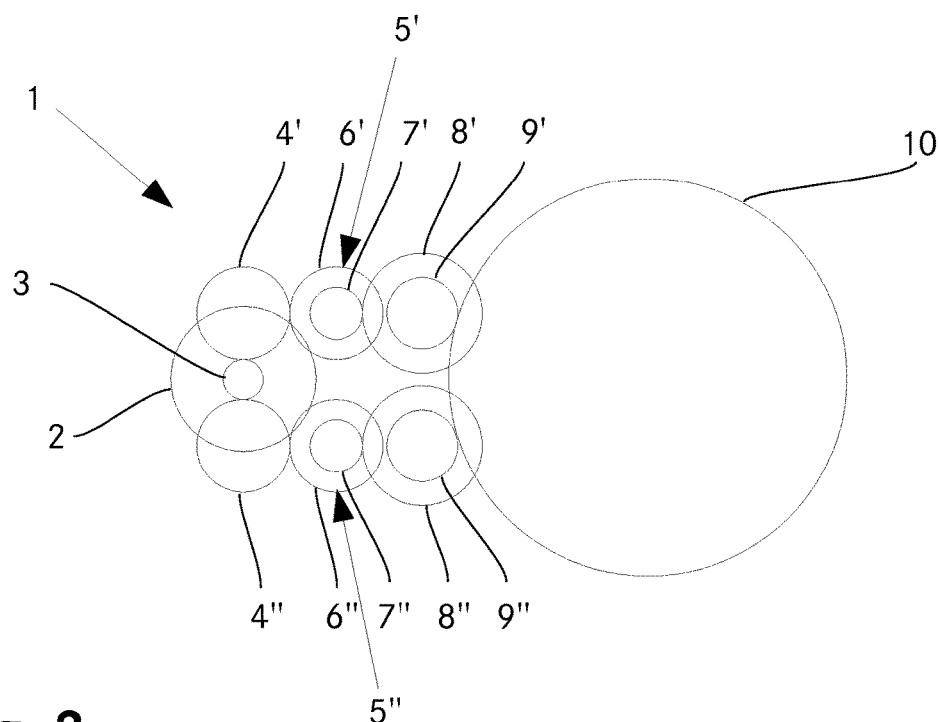
FIG. 2: A schematic top view of another embodiment of a heavy duty drive arrangement.

FIG. 2 schematically depicts another embodiment of a heavy duty drive 1 according to the present invention. In this embodiment, two sequences of first and second spur gears are arranged on two sides of the pinion 3 of the motor 2. Hence, said pinion 3 meshes with a first gear wheel 4', 4" of each of the two first spur gears. These two first gear wheels 4', 4" of the first spur gears each mesh with an input side wheel 6', 6" of the two dynamic couplings 5', 5". The output side wheels 7', 7" of both dynamic couplings 5', 5" each mesh with a gear wheel 8', 8" of two second spur gears, said gear wheels 8', 8" of the second spur gears each meshing with a drive pinion 9', 9" which each is configured to mesh with the ring gear 10 of a working equipment. Both sequences comprising a first gear wheel 4', 4" of the first spur gear, a dynamic coupling 5', 5", a gear wheel 8', 8" of the second spur gear and a pinion 9', 9" are arranged parallel to each other, while the pinion 3 of the motor 2 is arranged centrally between both first gear wheels 4', 4" of the first spur gears, hence allowing an equal torque split to both sequences.

Figure 3:
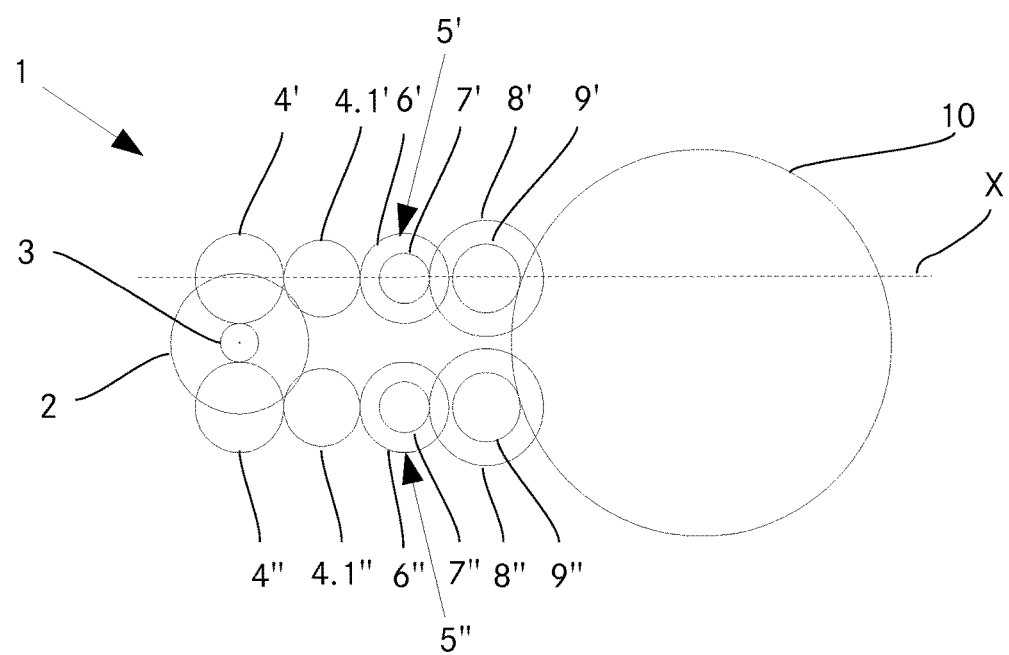
FIG. 3: A schematic top view of a further embodiment of a heavy duty drive arrangement with an additional gear wheel.

The embodiment shown on FIG. 3 corresponds essentially to the embodiment as shown in FIG. 2, the only difference being the presence of an additional, second gear wheel 4.1', 4.1" in the first spur gears. In this embodiment, the first gear wheels 4', 4" mesh with the pinion 3 of the motor 2 as well as with the second gear wheels 4.1', 4.1" of the first spur gear. Said second gear wheels 4.1', 4.1" of the first spur gear each then mesh with the input side wheels 6', 6" of the two dynamic couplings 5', 5". In this embodiment, the second spur gear comprises a single gear wheel 8', 8". However, it is understood that the second spur gear may also comprise additional gear wheels. Further, said first spur gear may also comprise further gear wheels, such as a third, fourth, etc. gear wheel. In the embodiment shown, the first gear wheels 4', 4" and second gear wheels 4.1', 4.1" of the first spur gear have a different diameter, while it is understood that said first gear wheels 4', 4" and said second gear wheels 4.1', 4.1" of said first spur gear may also have an identical diameter and number of teeth such as not to exhibit any gear ratio within said first spur gear.

Figure 4:
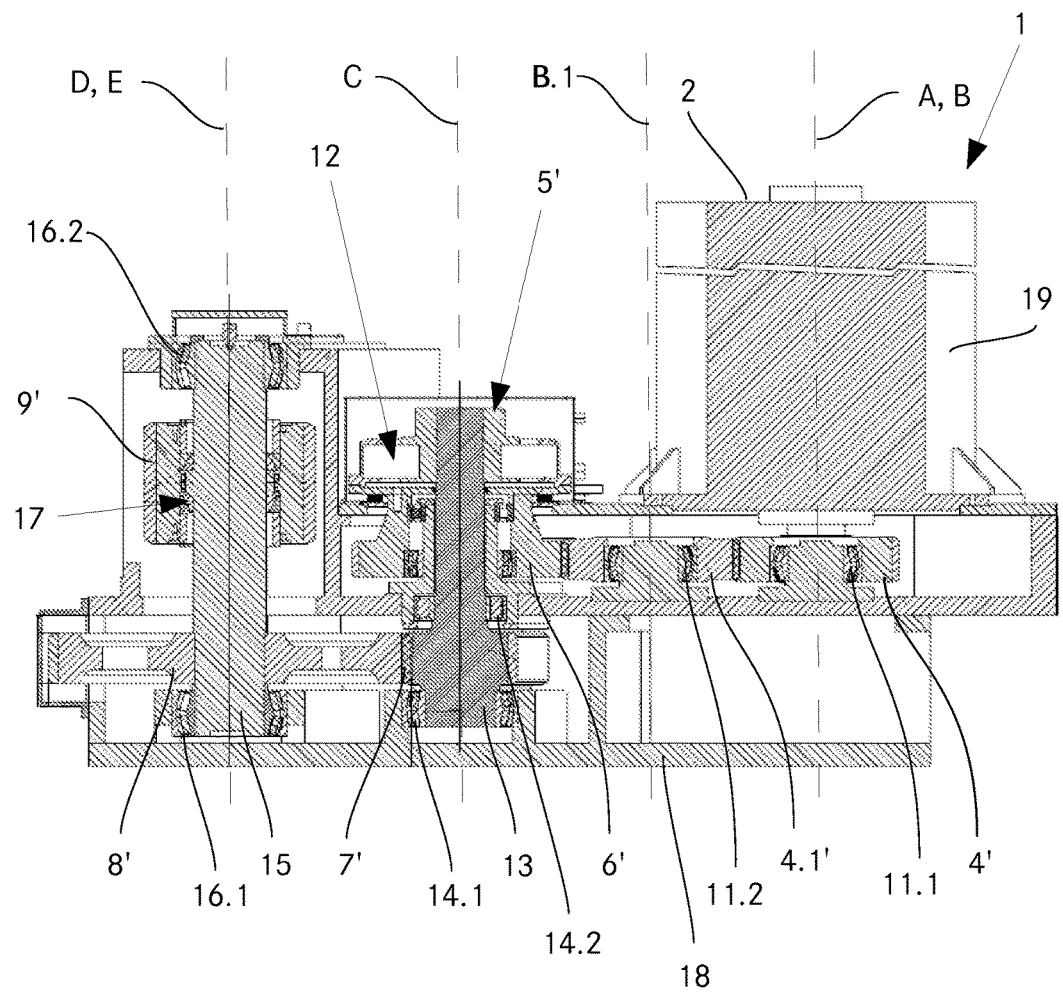
FIG. 4: A section through a heavy duty drive corresponding to the embodiment shown on FIG. 3.

FIG. 4 shows a sectional drawing through a heavy duty drive arrangement 1 according to FIG. 3 along the axis X. As may be clearly seen on this picture, the rotor axis A of the motor 2 is parallel to the axis B of the first gear wheel 4' of the first spur gear as well as to the axis B.1 of the second gear wheel 4.1'. Further, the axis C of the dynamic coupling 5', the axis D of the gear wheel 8' of the second spur gear and the axis E of the drive pinion 9' are each parallel to each other and to the rotor axis A of the motor 2. In the representation shown in FIG. 4, the rotor axis A of the motor 2 lies behind the axis B of the first gear wheel 4' of the first spur gear in the direction of view, while the axis D of the gear wheel 8' of the second spur gear and the axis E of the drive pinion 9' are identical.

Further, it is to be noted that the motor 2 is arranged within a motor casing 19 and placed above the first spur gear in direction of gravity. Hence, no special sealing of the motor shaft has to be provided to prevent the inflow of lubricant from the first spur gear into the motor, as the lubricant will be drawn away from the motor by the action of gravity.

As may further be seen, the heavy duty drive 1 is enclosed by a casing 18 which provides a base for the attachment of the various parts of the drive arrangement 1. The first gear wheel 4' and the second gear wheel 4.1' of the first spur gear are each supported on a rotational bearing 11.1, 11.2, said rotational bearings 11.1, 11.2 preferably being roller bearings.

The input side wheel 6' of the dynamic coupling 5' meshes with the second gear wheel 4.1' of the first spur gear and is coupled to a transmission shaft 13 via a resilient element 12. The transmission shaft 13 is coupled to the output side wheel 7' of the dynamic coupling 5' and supported by rotational bearings 14.1, 14.2, which preferably are roller bearings. Hence, torque transmitted from the input side wheel 6' to the resilient element 12 will be transferred via transmission shaft 13 to the output side wheel 7'. The resilient element 12 dampens any angular vibration being transmitted back from the drive pinion 9' due to the operation of the working equipment, such that these vibrations to not affect or even damage the motor 2.

In the embodiment shown, the output side wheel 7' is located beneath the input side wheel 6'. However, this arrangement may also be the other way round in other embodiments. Further, the resilient element 12 might also be arranged between the input side wheel 6' and the output side wheel 7' instead of the arrangement shown. However, the arrangement shown facilitates the exchange and maintenance of the resilient element 12, as it is on top of the other elements of the dynamic coupling 5' and hence easily accessible. It is understood that resilient element 12 may comprise an elastic material or may be fluidic.

The output side wheel 7' of the dynamic coupling 5' meshes with the gear wheel 8' of the second spur gear, said gear wheel 8' being supported on a drive shaft 15. The drive shaft 15 is supported on two rotational bearings 16.1, 16.2 and connects the gear wheel 8' of the second spur gear with the drive pinion 9'. The drive pinion 9' is supported in a swivelling manner on the drive shaft 15 by means of a swivel mount 17. The swivel mount 17 allows an angular movement of the drive pinion 9' relative to its axis E while being rotationally rigid. This swivelling motion allows for an automatic alignment with a ring gear of a working equipment the drive pinion 9' is meshing with.

Figure 5:
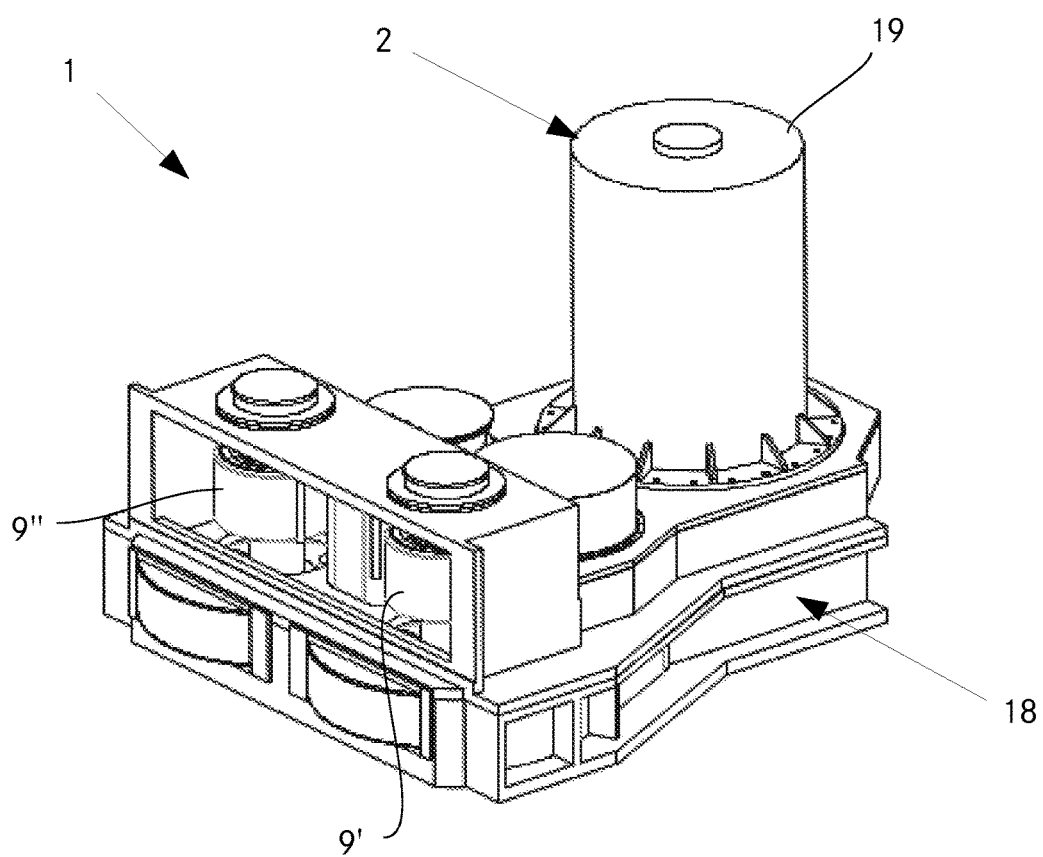
FIG. 5: A three-dimensional representation of the embodiment according to FIG. 3.

FIG. 5 shows a three-dimensional representation of the heavy duty drive arrangement as shown in FIG. 4. The components of the heavy duty drive arrangement 1 are enclosed by the rigid casing 18. The motor 2, which is enclosed by the motor casing 19 is arranged on top of the casing 18 of the heavy duty drive arrangement 1. The casing 18 comprises an opening allowing the two drive pinions 9', 9" to mesh with a ring gear of a working equipment. As such, the heavy duty drive arrangement 1 may be mounted in another location as the working equipment and then transported as a single piece to the location of the working equipment.

Figure 6:
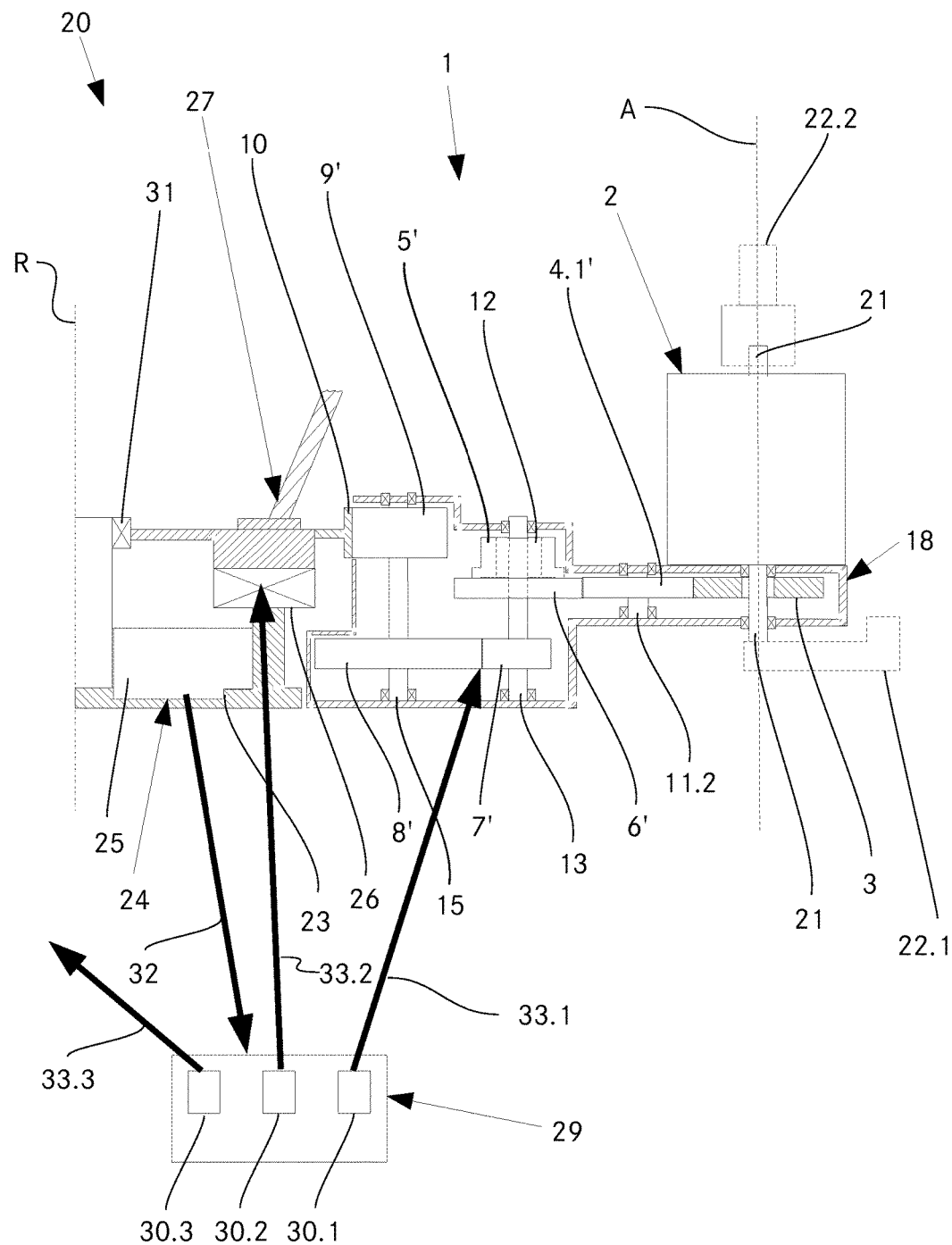
FIG. 6: A schematic sectional view of an inventive mill.

FIG. 6 is a representation of a mill 20 according to the present invention in a cut-view. For a better view, only one half of the mill is depicted, i.e. an identical arrangement would be found on the left side of the rotation axis R or the mill 20. Hence, the mill 20 according to the present invention comprises two heavy duty drive arrangements 1 according to the present invention. The cut axis of this representation is displaced from the axis X which was used for the cut-view of FIG. 4. In FIG. 6, the cut axis joins the rotational axis R of the mill 20 with the rotor axis A of the motor 2.

The placement of auxiliary drives 22.1, 22.2 is shown in dotted lines on FIG. 6. In a first variation, an auxiliary drive 22.1 may be arranged beneath the motor 2 and coupled to the motor shaft 21 such as to drive the heavy duty drive 1 during maintenance. In a second variation, an auxiliary drive 22.2 may be arranged on top of the motor 2 and coupled to the motor shaft 21.

As may be recognized in this figure, the drive pinion 9' of the heavy duty drive 1 meshes with the ring gear 10 attached to a milling table 27 of the mill 20. The milling table 27 is rotatably supported on an axial bearing 26. A further support of the milling table is provided by the radial bearing 31 which is located around the axis or rotation R of the mill 20. Both the axial bearing 26 and the radial bearing 31 are supported on a mill fundament 23. Beneath the milling table 27 a central tank 24 for lubricant 25 is provided. In most applications, lubricant 25 is oil. A lubricant provisioning device 29 draws lubricant 25 from the central tank 24 via a fluid connection 32 (for reasons of simplicity, fluid connections are only represented schematically by means of arrows). As an alternative or addition to the central tank, one or two separately placed tanks can be used. The lubricant provisioning device 29 includes one to three pumps 30.1, 30.2, 30.3. If three pumps are used: A first pump 30.1 provides lubricant 25 to the heavy duty drive arrangement 1 via a first fluid connection 33.1. A second pump 30.2 dispenses lubricant 25 to the axial bearing 26 via a second fluid connection 33.2. The second heavy duty drive arrangement 1, which is not shown in the figure, is provided with lubricant 25 by means of a third pump 30.3.

Figure 7:
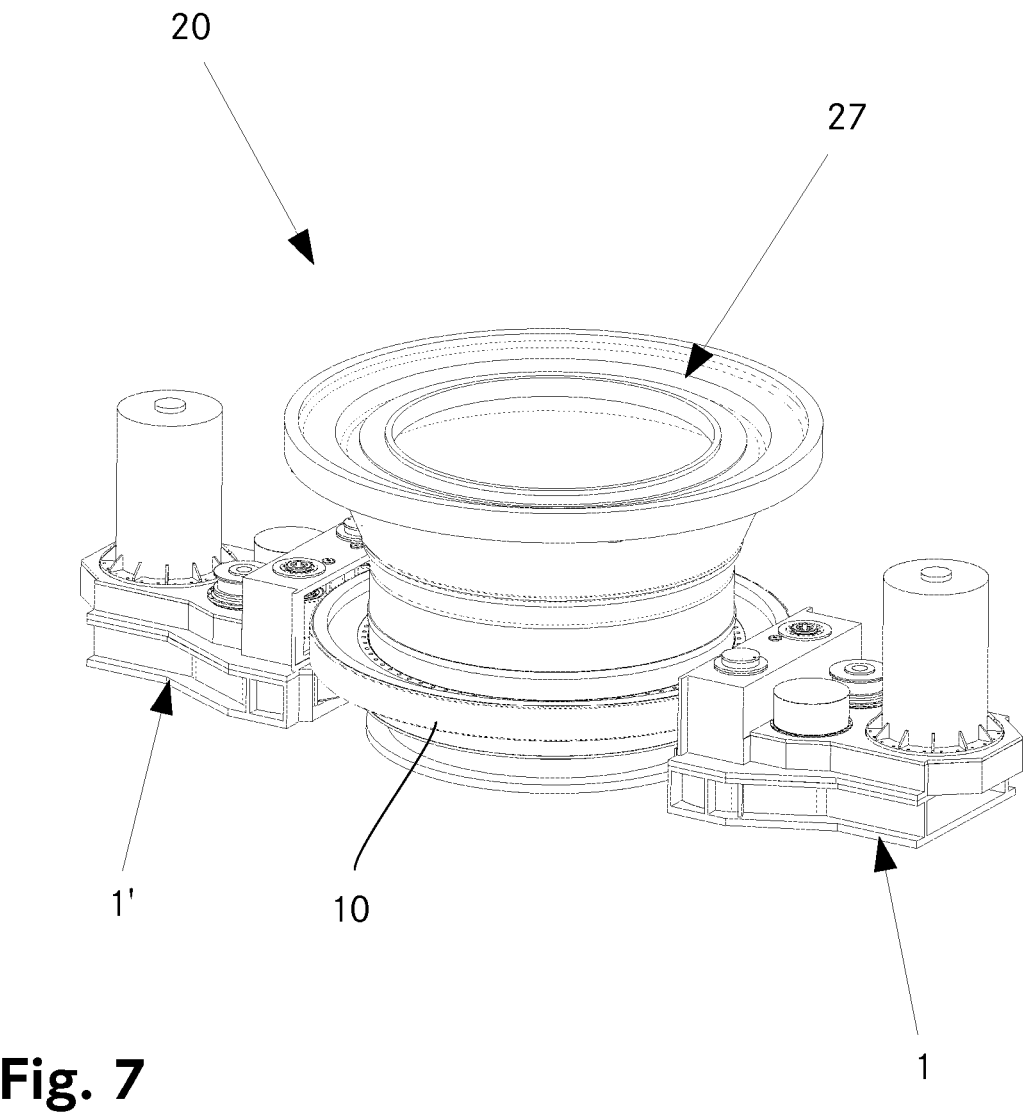
FIG. 7: A three-dimensional representation of the mill shown in FIG. 6.

FIG. 7 is a three-dimensional representation of the mill 20 as described in connection with FIG. 6. As may be seen, the mill 20 comprises two heavy duty drive arrangements 1, 1' according to the present invention. The drive pinions 9', 9" of both heavy duty drive arrangements 1, 1' mesh with the ring gear 10 connected to the milling table 27. It is understood that the mill 20 will comprise more elements in order to be functional, such as e.g. mill rollers, a fundaments, rocker arms etc. For reasons of simplicity, these elements which constitute the state of the art are not shown on FIG. 7.

The invention claimed is:

1. A mill comprising a milling table supported by at least one axial bearing and having a ring gear affixed to the milling table, the mill further comprising a heavy duty drive arrangement, the heavy duty drive arrangement comprising:
    a motor having a rotor axis, said motor driving a pinion; and
    a first sequence comprising:
        a first spur gear comprising a first gear wheel meshing with said pinion driven by the motor, said first gear wheel having an axis which is parallel to the rotor axis of the motor such that the axis of the first gear wheel diverges from the rotor axis by less than 5 degrees;
        a second spur gear comprising a gear wheel, said gear wheel of the second spur gear having an axis which is parallel to the rotor axis of the motor such that the axis of the gear wheel of the second spur gear diverges from the rotor axis by less than 5 degrees;
        a dynamic coupling comprising an input side wheel and an output side wheel; the input side wheel being dynamically coupled to the output side wheel via a resilient element; the resilient element comprising an elastic or fluidic material; the dynamic coupling being positioned between the first spur gear and the second spur gear; the input side wheel being driven by the first spur gear and the output side wheel driving the second spur gear; and, drive pinion meshing with the ring gear and being coupled to the gear wheel of the second spur gear and having an axis of rotation which is parallel to the rotor axis such that the axis of the drive pinion diverges from the rotor axis by less than 5 degrees.

2. The mill according to claim 1, comprising a lubrication arrangement having a central tank, wherein lubricant from said central tank is provided to a lubricant provisioning device, and wherein the lubricant provisioning device comprises at least one pump.

3. The mill according to claim 1, wherein said heavy duty drive arrangement comprises a second sequence identical to the first sequence, wherein the first gear wheel of each sequence meshes with the pinion driven by the motor, and wherein the drive pinion of each sequence meshes with the ring gear.

4. The mill according to claim 3, wherein the pinion driven by the motor is arranged centrally between the first gear wheel of each sequence.

5. The mill according to claim 1, wherein the pinion driven by the motor is supported such that it is movable in at least one direction perpendicular to the rotor axis.

6. The mill according to claim 1, wherein said drive pinion is supported in a swivelling manner relative to an axis of rotation of the drive pinion.

7. The mill according to claim 1, wherein said first spur gear or said second spur gear comprises more than one gear wheel.

8. The mill according to claim 1, wherein said dynamic coupling is an elastic coupling or a hydrodynamic coupling.

* * * * *